(12) United States Patent
Park et al.

(10) Patent No.: US 12,477,092 B2
(45) Date of Patent: Nov. 18, 2025

(54) INFRARED LIGHT SOURCE MODULE HAVING SHIELD CAN EMBEDDED THEREIN AND ELECTRONIC DEVICE COMPRISING SAME

(71) Applicant: SAMSUNG ELECTRONICS CO., LTD., Suwon-si (KR)

(72) Inventors: Byeonghoon Park, Suwon-si (KR); Yongchan Keh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 18/414,240

(22) Filed: Jan. 16, 2024

(65) Prior Publication Data

US 2024/0155097 A1  May 9, 2024

Related U.S. Application Data

(63) Continuation of application No. PCT/KR2022/010425, filed on Jul. 18, 2022.

(30) Foreign Application Priority Data

Jul. 16, 2021 (KR) .......................... 10-2021-0093489

(51) Int. Cl.
*G06F 1/16* (2006.01)
*H01S 5/00* (2006.01)
(Continued)

(52) U.S. Cl.
CPC ........... *H04N 13/254* (2018.05); *H01S 5/005* (2013.01); *H01S 5/183* (2013.01); *H04N 13/25* (2018.05)

(58) Field of Classification Search
CPC ...... H04N 13/254; H04N 13/25; H01S 5/005; H01S 5/183; G01S 7/4814; G01S 7/4813;
(Continued)

(56) References Cited

U.S. PATENT DOCUMENTS 11,893,959 B2 * 2/2024 Kim ......................... G09G 5/10
2009/0115891 A1 5/2009 Ryu et al.
(Continued)

FOREIGN PATENT DOCUMENTS

KR  10-2009-0044768 A   5/2009
KR  10-2014-0076862 A   6/2014
(Continued)

OTHER PUBLICATIONS

Search Report issued on Oct. 28, 2022 by International Searching Authority in International Application No. PCT/2022/010425.
(Continued)

*Primary Examiner* — Howard D Brown, Jr.
(74) *Attorney, Agent, or Firm* — Sughrue Mion, PLLC (57) ABSTRACT

The electronic device includes an infrared light emitter disposed on the printed circuit board, the infrared light emitter corresponding to a first light-transmitting area of the plurality of light-transmitting areas, and being configured to emit infrared light through the first light-transmitting area; and an infrared receiver corresponding to a second light-transmitting area of the plurality of light-transmitting areas. The infrared light emitter includes: a substrate including a third surface facing a third direction and a fourth surface facing a fourth direction opposite to the third direction; at least one electronic component including a light source disposed on the fourth surface of the substrate; a module housing surrounding the at least one electronic component of the substrate; and a shielding member disposed in the module housing, the shielding member being configured to shield electromagnetic waves.

20 Claims, 9 Drawing Sheets

(51) Int. Cl.
*H01S 5/183* (2006.01)
*H04N 13/25* (2018.01)
*H04N 13/254* (2018.01)

(58) Field of Classification Search
CPC ........ G06F 1/16; G06F 1/1684; G06F 1/1628; G06F 1/1656
See application file for complete search history.

(56) References Cited

U.S. PATENT DOCUMENTS

| | | | |
|---|---|---|---|
| 2009/0302464 A1* | 12/2009 | Nakagawa | ........ H01L 23/49838 257/737 |
| 2013/0088941 A1 | 4/2013 | Elian et al. | |
| 2015/0215501 A1 | 7/2015 | Cho | |
| 2015/0281532 A1 | 10/2015 | Yu et al. | |
| 2017/0162620 A1 | 6/2017 | Wang et al. | |
| 2017/0262026 A1 | 9/2017 | Jin | |
| 2019/0196546 A1* | 6/2019 | Wu | ........................ G01J 5/0806 |
| 2019/0316959 A1* | 10/2019 | Halliday | ................ H04N 23/55 |
| 2020/0056771 A1 | 2/2020 | Cho et al. | |

FOREIGN PATENT DOCUMENTS

| | | |
|---|---|---|
| KR | 10-2015-0090715 | 8/2015 |
| KR | 10-2017-0021328 A | 2/2017 |
| KR | 100-2017-0105700 A | 9/2017 |
| KR | 10-2020-0007600 A | 1/2020 |
| KR | 10-2020-0019406 A | 2/2020 |
| KR | 10-2020-0115707 A | 10/2020 |

OTHER PUBLICATIONS

Written Opinion issued on Oct. 28, 2022 by International Searching Authority in International Application No. PCT/2022/010425.

* cited by examiner

INFRARED LIGHT SOURCE MODULE HAVING SHIELD CAN EMBEDDED THEREIN AND ELECTRONIC DEVICE COMPRISING SAME

CROSS-REFERENCE TO RELATED APPLICATIONS

This application is a by-pass continuation application of International Application No. PCT/KR2022/010425, filed on Jul. 18, 2022, which is based on and claims priority to Korean Patent Application No. 10-2021-0093489, filed on Jul. 16, 2021, in the Korean Intellectual Property Office, the disclosures of which are incorporated by reference herein their entireties.

BACKGROUND

1. Field

The disclosure relates to an infrared light source having a shield can built therein as an infrared light source module (an infrared light emitter) for obtaining depth information, and an electronic device including the infrared light source.

2. Description of the Related Art

Techniques of obtaining depth information about a subject and using the depth information are increasingly used for electronic devices. The use of depth information may lead to improvement of the quality of images or videos taken or allow the electronic device to be equipped with a security function, such as user facial recognition. To obtain depth information about a subject, multiple schemes are available, such as a time of flight (TOF) scheme which uses the TOF of light radiated onto a subject and reflected back from the subject to obtain depth information, a stereo scheme which obtains depth information by analyzing information about a plurality of images obtained using two or more cameras by triangulation, or a scheme that uses structured light and optical triangulation.

In the TOF scheme, an electronic device may emit light (e.g., infrared light) onto an object, receive light reflected from the object, and detect depth information based on a time from an emission time to a reception time. For this purpose, the electronic device may include an infrared light source and an infrared receiver to detect distance information about the object. The distance information (e.g., depth information) may be reliably measured when the infrared light source has sufficient power. To this end, the infrared light source may receive higher power than other electronic components, such as image sensors for a camera or the infrared receiver. However, due to the higher power supply, the infrared light source may generate more electromagnetic waves than other electronic components. Accordingly, a shielding member (e.g., a shield can) for blocking electromagnetic waves emitted by the infrared light source may be disposed around the infrared light source. An infrared light source module in which the shielding member is disposed to surround the infrared light source may be mounted on one surface of the electronic device, for example, a smartphone.

One of the recent issues in installing an optical module such as the infrared light source module in a smartphone is to reduce the size of a visually identifiable window hole by installing the optical module in the smartphone. As described above, however, when a shielding member is disposed to surround an infrared light source, the separation distance between the infrared light source and a cover glass is increased by the shielding member, thereby increasing the size of the window hole. As the size of the window whole increases, the aesthetics of the appearance may deteriorate.

SUMMARY

According to one or more embodiments of the disclosure, an electronic device having an aesthetic appearance while still having a light source or receiver for detecting depth information about an object arranged therein may be provided.

According to one or more embodiments of the disclosure, an electronic device for suppressing or mitigating generation of electromagnetic waves while supplying stable power to a light source for detecting depth information about a subject may be provided.

According to an aspect of the disclosure, an electronic device including: a housing including a first surface facing a first direction and a second surface facing a second direction opposite to the first direction; a plurality of light-transmitting areas on the second surface; a printed circuit board disposed between the first surface and the second surface; an infrared light emitter disposed on the printed circuit board, the infrared light emitter corresponding to a first light-transmitting area of the plurality of light-transmitting areas, and being configured to emit infrared light through the first light-transmitting area; and an infrared receiver corresponding to a second light-transmitting area of the plurality of light-transmitting areas, wherein the infrared light emitter includes: a substrate including a third surface facing a third direction and a fourth surface facing a fourth direction opposite to the third direction; at least one electronic component including a light source disposed on the fourth surface of the substrate; a module housing surrounding the at least one electronic component of the substrate; and a shielding member disposed in the module housing, the shielding member being configured to shield electromagnetic waves.

Further, according to one or more embodiments of the disclosure, as an infrared light source module with a shield can built therein is provided, the generation of electromagnetic waves from a light source may be suppressed or mitigated, while an increase in the size of a window hole is prevented in an electronic device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

It should be appreciated that one or more embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1$^{st}$" and "2$^{nd}$" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., a program) including one or more instructions that are stored in a storage medium (e.g., internal memory or external memory) that is readable by a machine (e.g., an electronic device). For example, a processor (e.g., a processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

Figure 1:
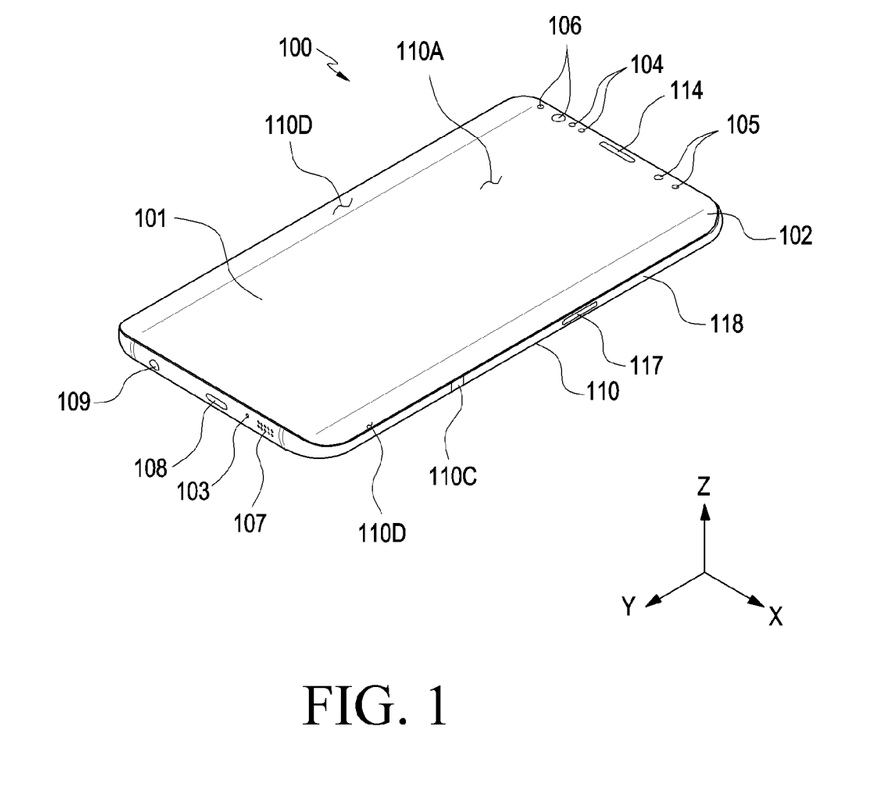
FIG. 1 is a perspective view illustrating a front surface of an electronic device according to one or more embodiments.
Figure 2:
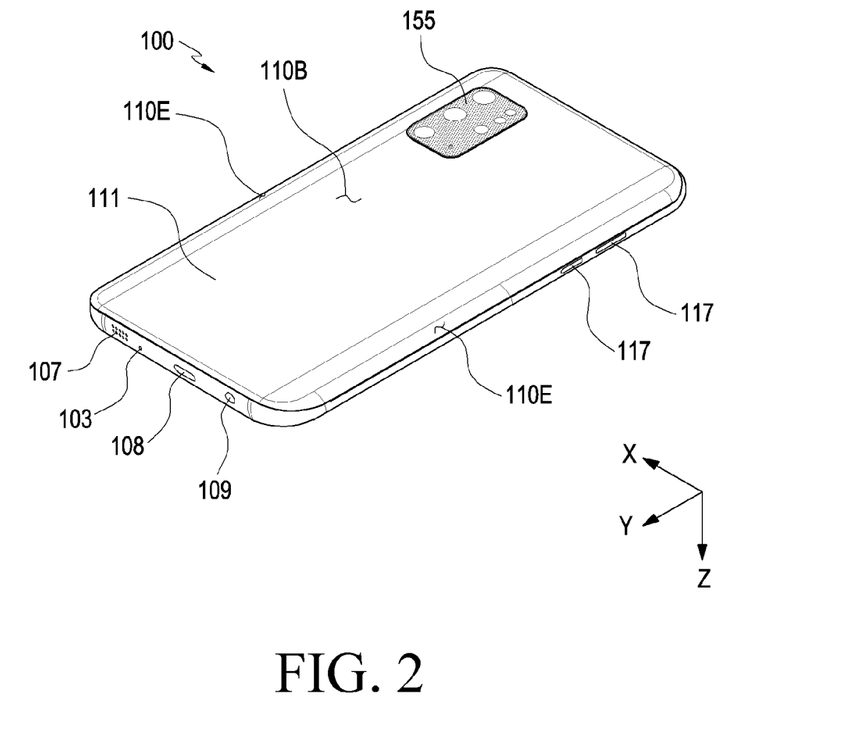
FIG. 2 is a perspective view illustrating a rear surface of the electronic device illustrated in FIG. 1 according to one or more embodiments.

FIG. 1 is a perspective view illustrating a front surface of an electronic device 100 according to one or more embodiments. FIG. 2 is a perspective view illustrating a rear surface of the electronic device 100 illustrated in FIG. 1.

Referring to FIGS. 1 and 2, the electronic device 100 according to an embodiment may include a housing 110 which includes a first surface (or front surface) 110A, a second surface (or rear surface) 110B, and side surfaces 110C surrounding a space between the first surface 110A and the second surface 110B. In another embodiment, the housing may refer to a structure that forms a portion of the first surface 110A of FIG. 1, the second surface 110B of FIG. 2, and the side surfaces 110C. According to an embodiment, at least a portion of the first surface 110A may be formed by a front plate 102 (e.g., a glass plate or polymer plate including various coating layers) at least a portion of which is substantially transparent. In another embodiment, the front plate 102 may be coupled with the housing 110 to form an internal space with the housing 110. In one or more embodiments, the term "internal space" may refer to an internal space (or an area) of the housing 110, which accommodates at least a portion of a display 101.

According to one or more embodiments, the second surface 110B may be formed by a rear plate 111 which is substantially opaque. The rear plate 111 may be formed of, for example, coated or tinted glass, ceramic, a polymer, a metal (e.g., aluminum, stainless steel (STS), or magnesium), or a combination of at least two of these materials. The side surfaces 110C may be coupled with the front plate 102 and the rear plate 111 and formed by a side bezel structure (or "side member") 118 including a metal or a polymer. In one or more embodiments, the rear plate 111 and the side bezel structure 118 may be integrally formed and include the same material (e.g., a metallic material such as aluminum).

In the illustrated embodiment, the front plate 102 may include two first areas (e.g., curved surface areas) 110D, which are bent and extend seamlessly from the first surface 110A toward the rear plate 111, at both long edge ends thereof. In the illustrated embodiment, the rear plate 111 may include two second areas (e.g., curved surface areas) 110E, which are bent and extend seamlessly from the second surface 110B toward the front plate 102, at both long edge ends thereof. In one or more embodiments, the front plate 102 (or the rear plate 111) may include only one of the first areas 110D (or the second areas 110E). In another embodiment, some of the first areas 110D or the second areas 110E may not be included. In these embodiments, when viewed from the side surfaces of the electronic device 100, the side bezel structure 118 may have a first thickness (or width) on a side surface that does not include any of the above first areas 110D or second areas 110E (e.g., a side surface on which a connector hole 108 is formed), and a second thickness less than the first thickness on a side surface that includes any of the above first areas 110D or second areas 110E (e.g., side surfaces on which key input devices 117 are disposed).

According to an embodiment, the electronic device 100 may include at least one of the display 101, audio modules 103, 107, and 114, a sensor module 104, camera modules 105 and 155, the key input devices 117, a light emitting element 106, or connector holes 108 and 109. In one or more embodiments, the electronic device 100 may not be provided with at least one (e.g., the key input devices 117 or the light emitting element 106) of the components or may additionally include other components.

The display 101 may be visually exposed, for example, through a substantial portion of the front plate 102. In one or more embodiments, at least a portion of the display 101 may be exposed through the front plate 102 forming the first surface 110A and the first areas 110D of the side surfaces 110C. In one or more embodiments, a corner of the display 101 may be formed substantially in the same shape as that of an adjacent periphery of the front plate 102. In another embodiment, a gap between the periphery of the display 101 and the periphery of the front plate 102 may be substantially equal to increase the visually exposed area of the display 101.

In another embodiment, a recess or an opening may be formed in a portion of a view area (e.g., an active area) or an area (e.g., an inactive area) outside the view area in the display 101, and at least one of the audio module 114, the sensor module 104, the camera modules 105 and 155, or the light emitting element 106, which is aligned with the recess or the opening, may be included. In another embodiment, at least one of the audio module 114, the sensor module 104, the camera modules 105 and 155, or the light emitting element 106 may be included on a rear surface of the view area of the display 101. In another embodiment, the display 101 may be incorporated with or disposed adjacent to a touch sensing circuit, a pressure sensor capable of measuring the intensity (pressure) of a touch, and/or a digitizer that detects a magnetic field-based stylus pen. In an embodiment, at least a portion of the sensor module 104 and/or at least some of the key input devices 317 may be disposed in the first areas 110D and/or the second areas 110E.

According to an embodiment, the audio modules 103, 107, and 114 may include a microphone hole 103 and speaker holes 107 and 114. A microphone for obtaining an external sound may be disposed in the microphone hole 103, and in one or more embodiments, a plurality of microphones may be disposed to detect the direction of a sound. The speaker holes 107 and 114 may include an external speaker hole 107 and a receiver hole 114 for calls. In one or more embodiments, the speaker holes 107 and 114 and the microphone hole 103 may be implemented as a single hole, or a speaker (e.g., a piezo speaker) may be included without the speaker holes 107 and 114.

The sensor module 104 may generate an electrical signal or data value corresponding to an internal operating state of the electronic device 100 or an external environmental state. The sensor module 104 may include, for example, a first sensor module 104 (e.g., a proximity sensor) and/or a second sensor module (e.g., a fingerprint sensor), disposed on the first surface 110A, and/or a third sensor module (e.g., a heart rate monitor (HRM) sensor or a fingerprint sensor) disposed on the second surface 110B of the housing 110. A fingerprint sensor may be disposed on the second surface 110B as well as on the first surface 110A (e.g., the display 101) of the housing 110. The electronic device 100 may further include a sensor module, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera modules 105 and 155 may include a first camera device 105 disposed on the first surface 110A of the electronic device 100, and a second camera device 155 disposed on the second surface 110B of the electronic device 100. The second camera device 155 may include, for example, a first component (e.g., a later-described IR light emitter (e.g., an IR light emitter 161 of FIG. 5), a second component (e.g., an IR receiver (e.g., a later-described IR receiver 162 of FIG. 5), an optical sensor (e.g., a later-described optical sensor 163 of FIG. 5), and/or a camera array (e.g., a later-descried camera array 170 of FIG. 5). The camera modules 105 and 155 may include one or more lenses, an image sensor, and/or an image signal processor. In an embodiment, a flash may be disposed on the second surface 110B. The flash may include, for example, a light emitting diode (LED) or a xenon lamp. In one or more embodiments, two or more lenses (an IR camera, a wide-angle lens, and a telephoto lens) and image sensors may be arranged on one surface of the electronic device 100.

The key input devices 117 may be arranged on the side surfaces 110C of the housing 110. In another embodiment, the electronic device 100 may not include some or any of the key input devices 117, and the key input devices 117 which are not included may be implemented in other forms such as soft keys on the display 101.

The light emitting element 106 may be disposed, for example, on the first surface 110A of the housing 110. The light emitting element 106 may provide, for example, state information about the electronic device 100 in the form of light. In another embodiment, the light emitting element 106 may provide, for example, a light source interworking with an operation of the camera module 105. The light emitting element 106 may include, for example, an LED, an IR LED, and a xenon lamp.

The connector holes 108 and 109 may include a first connector hole 108 capable of accommodating a connector (e.g., a universal serial bus (USB) connector) for transmitting and receiving power and/or data to and from an external electronic device and/or a second connector hole (e.g., an earphone jack) 109 capable of accommodating a connector for transmitting and receiving an audio signal to and from an external electronic device.

Figure 3:
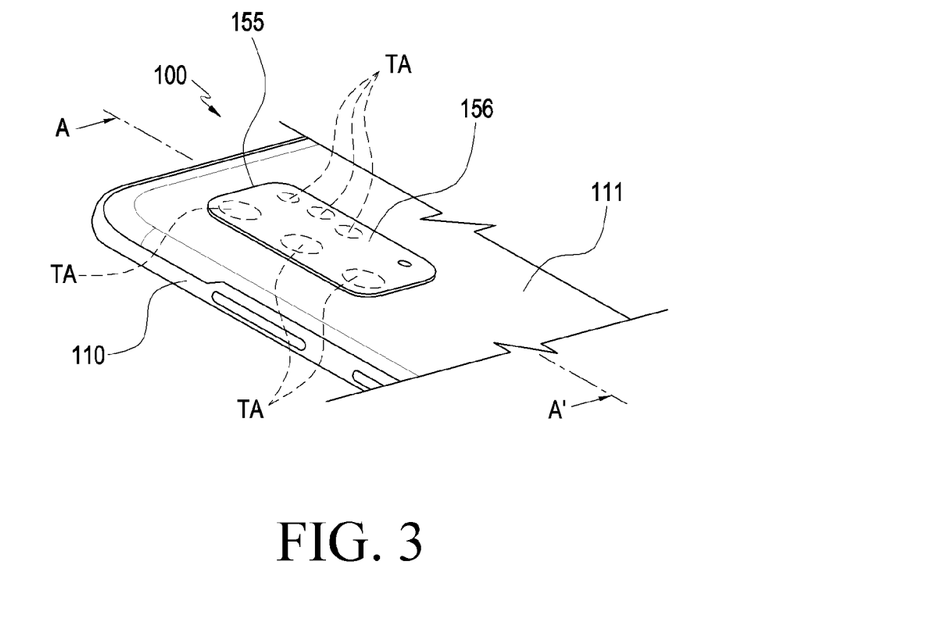
FIG. 3 is an enlarged perspective view illustrating a portion of an electronic device according to one or more embodiments of the disclosure.

FIG. 3 is an enlarged perspective view illustrating a portion of the electronic device 100 according to one or more embodiments of the disclosure.

Referring to FIG. 3, the electronic device 100 may include the housing 110 that includes all structures visually identifiable to a user (or touchable by the user) from the exterior of the electronic device. The housing 110 may include the rear plate 111 which may be formed of coated or tinted glass, ceramic, a polymer, a metal, or a selective combination of the materials listed above and which may be substantially opaque.

The camera module 155 (e.g., the second camera device 155 of FIG. 2) may be disposed on the rear plate 111 and include a camera window 156 forming the exterior of the camera module 155. The camera window 156 may be provided with a plurality of light-transmitting areas TA, where "light-transmitting areas" may refer to areas that transmit visible light as well as non-visible light (e.g., ultraviolet (UV) or IR light), and in an embodiment, refer to areas that transmit non-visible light but block visible light. According to an embodiment, the plurality of light-transmitting areas TA formed on the camera window 156 may be defined as areas where a decorative layer (hereinafter, a decorative layer 157 of FIG. 6) formed on a rear surface of the camera window 156 is removed.

Figure 4:
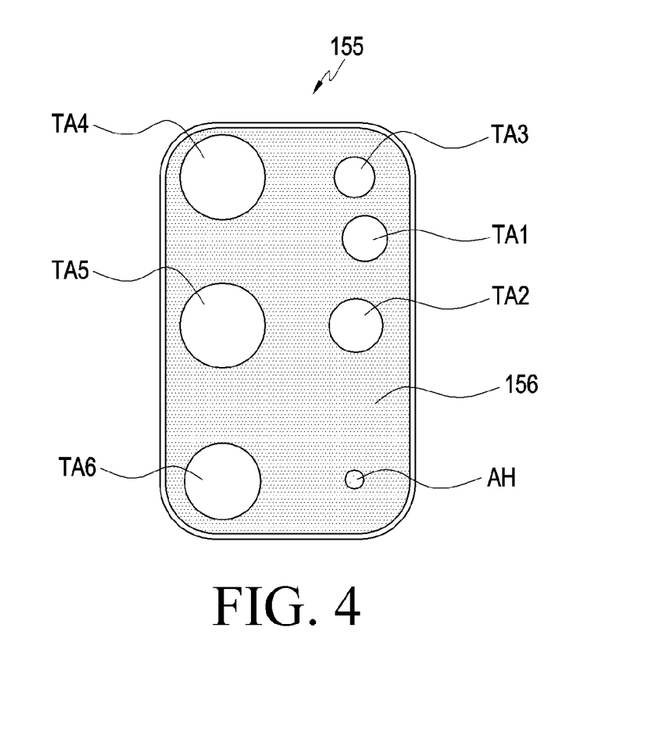
FIG. 4 is a plan view illustrating a camera module having light-transmitting areas formed therein in an electronic device according to one or more embodiments of the disclosure.
Figure 5:
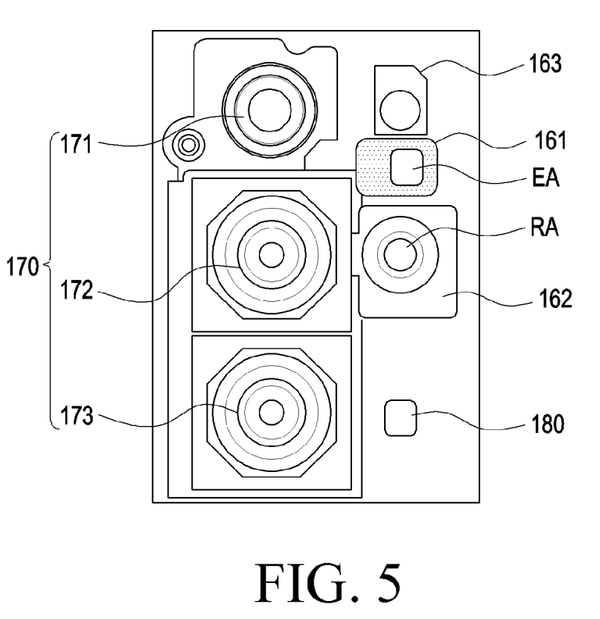
FIG. 5 is a plan view illustrating electronic components disposed within a camera module in an electronic device according to one or more embodiments of the disclosure.

FIG. 4 is a plan view illustrating the camera module 155 on which light-transmitting areas are formed in an electronic device (e.g., the electronic device 100 of FIG. 1) according to one or more embodiments of the disclosure. FIG. 5 is a plan view illustrating electronic components disposed within the camera module 155 in an electronic device (e.g., the electronic device 100 of FIG. 1) according to one or more embodiments of the disclosure.

Referring to FIGS. 4 and 5 together, the plurality of light-transmitting areas TA formed on the camera window 156 may include a first light-transmitting area TA1, a second light-transmitting area TA2, and a third light-transmitting area TA3. The first light-transmitting area TA1, the second light-transmitting area TA2, and the third light-transmitting area TA3 may be disposed approximately adjacent to each other and arranged along substantially one direction (e.g., a longitudinal direction (e.g., a Y-axis direction) of the electronic device). The first light-transmitting area TA1 is shown as formed between the second light-transmitting area TA2 and the third light-transmitting area TA3 in the embodiment of FIGS. 4 and 5, which may not necessarily be construed as limiting. Further, the plurality of light-transmitting areas TA may include a fourth light-transmitting area TA4, a fifth light-transmitting area TA5, and a sixth light-transmitting area TA6. The fourth light-transmitting area TA4, the fifth light-transmitting area TA5, and the sixth light-transmitting area TA6 may also be disposed adjacent to each other and arranged along substantially one direction (e.g., the longitudinal direction (e.g., the Y-axis direction) of the electronic device). In an embodiment, the camera window 156 may further include an acoustic hole AH formed to penetrate from an inner surface to an outer surface. For example, the acoustic hole AH may be provided to input an external sound into a microphone.

The position of the first light-transmitting area TA1, the second light-transmitting area TA2, the third light-transmitting area TA3, the fourth light-transmitting area TA4, the fifth light-transmitting area TA5, the sixth light-transmitting area TA6, or the acoustic hole AH described above may vary according to embodiments, and as needed, one component may be omitted or another component may be added. For example, the acoustic hole AH may be arranged together with the second light-transmitting area TA2 (and/or the third light-transmitting area TA3) in one direction (e.g., the Y-axis direction) of the electronic device 100. However, the disclosure is not limited thereto, and it should be noted that the acoustic hole AH may be omitted or disposed at a position other than the position illustrated in the drawing (e.g., on a side surface of the housing of the electronic device).

Referring to FIG. 5, the electronic device 100 according to one or more embodiments of the disclosure may include the IR light emitter 161 and the IR receiver 162, and include the camera array 170 disposed adjacent to them. In addition, according to an embodiment, the electronic device 100 may further include the optical sensor 163.

The IR light emitter 161 and the IR receiver 162 may be disposed to correspond to the first light-transmitting area TA1 and the second light-transmitting area TA2 of the plurality of light-transmitting areas. The IR light emitter 161 may output IR light, and the output IR light may be radiated to the outside of the electronic device through the first light-transmitting area TA1. After the IR light output from the IR light emitter 161 is reflected from a subject, at least a portion of the IR light may be incident on the IR receiver 162. The IR receiver 162, which is for receiving externally incident IR light, may provide a data signal based on the received IR light to a processor included in the electronic device. The processor of the electronic device 100 may detect or generate distance information (e.g., depth information) about the subject based on the IR light received at the IR receiver 162, for example, based on a time from a time when the IR light is emitted from the IR light emitter 161 to a time when the IR light is reflected from the subject and then received at the IR receiver 162. According to one or more embodiments, an IR emitting area EA of the IR light emitter 161 and a light receiving area RA of the IR receiver 162 may be aligned with the first light-transmitting area TA1 and the second light-transmitting area TA2, respectively.

The camera array 170 may include a first camera 171, a second camera 172, and/or a third camera 173 arranged along the longitudinal direction Y of the electronic device 100, and be disposed to be oriented toward a subject from one surface (e.g., the second surface 110B of FIG. 2) of the housing (e.g., the housing 110 of FIG. 1). According to an embodiment, the camera array 170 may be disposed to correspond to the fourth light-transmitting area TA4, the fifth light-transmitting area TA5, and the sixth light-transmitting area TA6 of the plurality of light-transmitting areas TA formed on the camera window 156. For example, a wide-angle camera, an ultra-wide-angle camera, and/or a telephoto camera may be available as a camera that may be included in the first camera 171, the second camera 172, and/or the third camera 173. The first camera 171, the second camera 172, and/or the third camera 173 may have the same or different pixels.

The optical sensor 163 may be disposed at a position corresponding to the third light-transmitting area TA3 of the plurality of light-transmitting areas. Various types of sensors may be applied to the optical sensor 163. According to an embodiment, the optical sensor 163 may be a camera (e.g., a telephoto camera) provided separately from the cameras included in the camera array 170. According to another embodiment, the optical sensor 163 may include at least one of, for example, an LED to function as a flash, a laser autofocus (AF) sensor to automatically adjust focus using a laser, or a flicker detection sensor to detect flickering of artificial light. As such, a variety of sensors may be applied to the optical sensor 163 according to embodiments.

According to an embodiment, the electronic device 100 may further include a microphone 180. The microphone 180 may be formed at a position corresponding to the acoustic hole AH. As described above, the microphone 180 may be omitted from the camera module 155, and its position is not necessarily limited to the position illustrated in the drawing.

Figure 6:
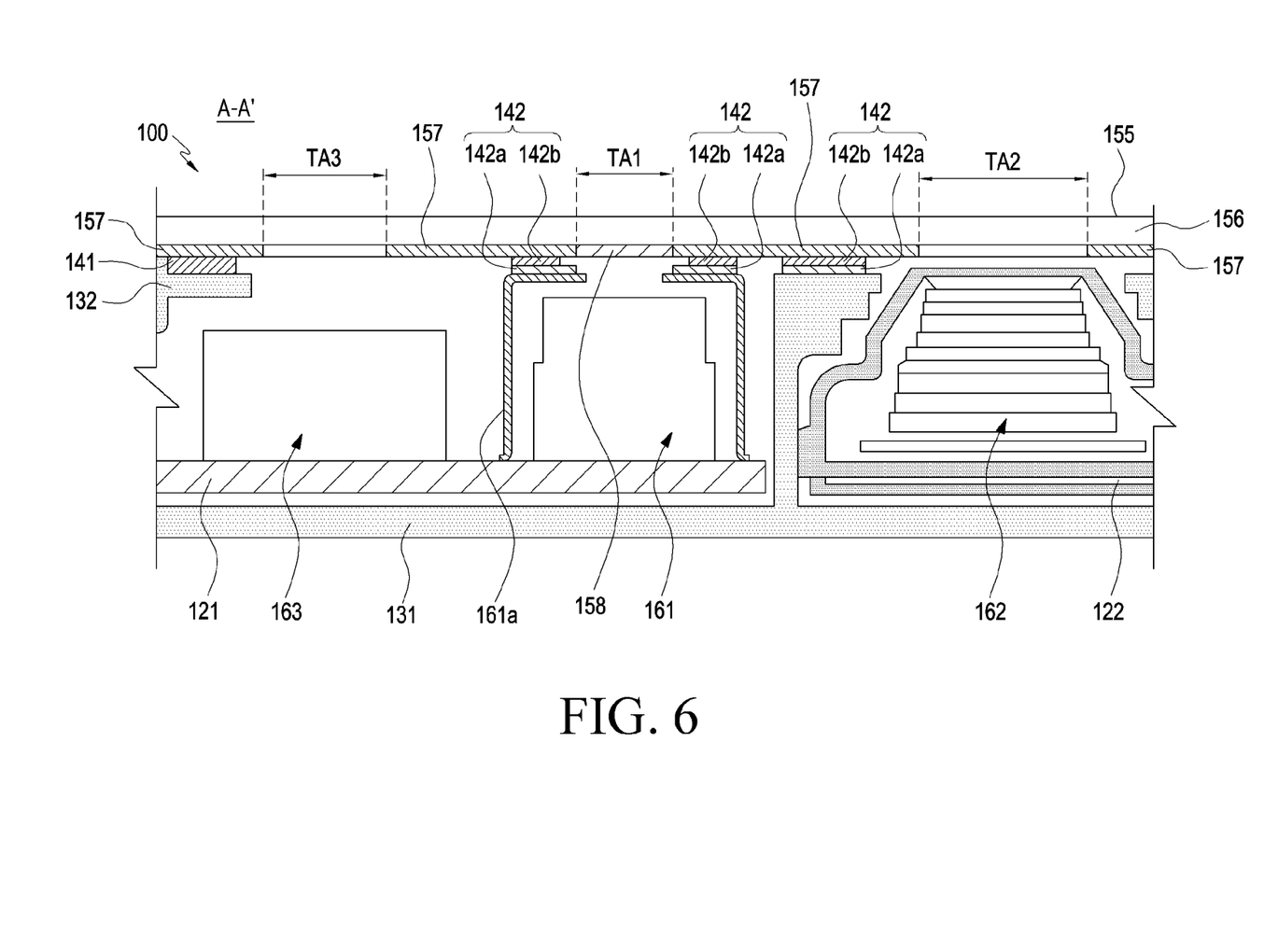
FIG. 6 is a cross-sectional view illustrating a portion of an electronic device, taken along a line A-A' of FIG. 3.

FIG. 6 is a cross-sectional view illustrating a portion of the electronic device 100, taken along a line A-A' of FIG. 3.

The electronic device 100 according to one or more embodiments of the disclosure may include a housing (e.g., the housing 110 of FIG. 1) including a first surface (e.g., the first surface 110A of FIG. 1) facing a first direction and a second surface (e.g., the second surface 110B of FIG. 1) facing a direction opposite to the first direction. Herein, the housing may be interpreted as including any structure that is visually identifiable to a user (or touchable by the user) from the exterior of the electronic device.

The camera module 155 including the camera window 156 may be formed on the second surface 110B of the housing 110. The camera window 156 may form a portion of the second surface of the housing 110 and have a plurality of light-transmitting areas formed thereon. Referring to FIG. 6, the first light-transmitting area TA1, the second light-transmitting area TA2, and the third light-transmitting area TA3 are shown as the plurality of light-transmitting areas.

According to one or more embodiments, the electronic device 100 may further include the decorative layer 157 formed on the rear surface of the camera window 156. The decorative layer 157 may substantially block visible light, thereby blocking structures in an internal space of the camera window 156 from being exposed to the outside of the electronic device 100, and portions of the decorative layer 157 corresponding to the plurality of light-transmitting areas (e.g., TA1, TA2, and TA3) may be removed. For example, the electronic device 100 may transmit visible light or IR light through the portions where the decorative layer 157 is removed.

According to one or more embodiments, the electronic device 100 may further include a printed layer 158 formed on the rear surface of the camera window 156. The printed layer 158 may be a component formed at a position corresponding to at least one of the plurality of light-transmitting areas, as opposed to the decorative layer 157 defining the plurality of light-transmitting areas (e.g., TA1, TA2, and TA3). For example, the printed layer 158 may be formed at a position corresponding to the first light-transmitting area TA1. The printed layer 158 may be configured to transmit approximately 20% or less of visible light, although it may completely block or transmit visible light, whereas the printed layer 158 may have a transmittance of approximately 80% or more for IR light. The printed layer 158 may block the first light-transmitting area TA1 or an internal space of the electronic device 100 adjacent to the first light-transmitting area TA1 from being visually exposed to the outside by substantially blocking visible light. As the printed layer 158 is provided, the position of the IR light emitter 161 or the first light-transmitting area TA1 may not substantially affect the exterior design of the electronic device, which may improve the design freedom of the exterior design of the electronic device 100.

At least one printed circuit board (PCB) 121 and 122 may be disposed inside the housing of the electronic device 100. Various circuit devices or integrated circuit (IC) chips such as a processor, a communication module, a power management module, memory, and an interface may be mounted on the PCBs 121 and 122. The IR light emitter 161 and the IR receiver 162 may be accommodated in the internal space of the housing 110 and mounted on the PCBs 121 and 122. According to an embodiment, the optical sensor 163 may be mounted on the PCB 121 at a position adjacent to the IR light emitter 161, as illustrated in FIG. 6. The IR light emitter 161, the IR receiver 162, and the optical sensor 163 may be mounted on the PCBs 121 and 122 at positions corresponding to the light-transmitting areas (e.g., TA1, TA2, and TA3), respectively.

According to an embodiment, the PCBs 121 and 122 may include a plurality of PCBs. For example, the PCBs may include a first PCB 121 as a main circuit board and a second PCB 122 as an auxiliary circuit board. In the embodiment illustrated in FIG. 6, the IR light emitter 161 and the optical sensor 163 are mounted on the first PCB 121, and the IR receiver 162 is mounted on the second PCB 122. For example, the IR light emitter 161 may be electrically connected to a processor or a power management module via a wiring within the first PCB 121 to receive a control signal or power. Compared to the IR receiver 162 or other electronic components (e.g., the optical sensor 163) around it, the IR light emitter 161, which is an electronic component receiving relatively high power and generating IR light, may generate a strong electromagnetic field. For example, the IR receiver 162 may be connected to the processor via a wiring within the second PCB 122, and operate at relatively low power compared to the IR light emitter 161. According to the embodiment illustrated in FIG. 6, the IR receiver 162 and the optical sensor 163 are shown as located opposite to each other relative to the IR light emitter 161, and the disclosure is not necessarily limited to this embodiment.

The IR light emitter 161 may include a vertical cavity surface emitting laser ("VCSEL") as a light source. A VCSEL is a laser device in which a resonance cavity including primarily a multi quantum well is placed between two distributed Bragg reflectors (DBRs) being multilayer thin film structures, and a gain is obtained by current injection. The VCSEL has a circular radiation shape with a small angle, which may allow it to be small in size and useful for low-cost module fabrication. VCSELs also facilitate two-dimensional arrangement because it is possible to integrate a plurality of surface lasers on a single semiconductor wafer. Tens to hundreds of VCSELs may be organized into an array and used as a device to obtain depth information about a subject. As a light source, the VCSEL may be driven with a high power of 2 W to 4 W or more to increase low noise and long-range detection characteristics, where the noise (e.g., electromagnetic interference (EMI) noise) of radio waves radiated at a certain frequency may exceed an acceptable threshold. Accordingly, the IR light emitter 161 may further include a shielding member 161a (e.g., a shield CAN) to block the noise.

According to one or more embodiments, the electronic device 100 may further include at least one film 142a and/or protective member 142b. The at least one film 142a may be, for example, an IR blocking film. The protective member 142b may be, for example, an elastomeric member. According to an embodiment, the at least one film 142a and/or protective member 142b may be provided in a space between a component (e.g., the IR light emitter 161 and the IR receiver 162) mounted inside the electronic device 100 and the housing (e.g., the camera window 156), and in an example, may serve to fill a gap between the component (e.g., the IR light emitter 161 and the IR receiver 162) mounted inside the electronic device 100 and the housing.

According to one or more embodiments, IR light output from the IR light emitter 161 may be reflected, refracted, or scattered due to a difference in refractive index at boundary surface(s) as the IR light penetrates the printed layer 158 or the camera window 156 (e.g., the first light-transmitting area TA1). As used herein, "boundary surface(s)" may include a bottom surface of the printed layer 158, a boundary surface between the printed layer 158 and the camera window 156, and a top surface (e.g., an outer surface) of the camera window 156. In a structure in which the IR light emitter 161 and the IR receiver 162 are disposed adjacent to each other, interference with IR light reflected from a subject may occur when reflected, refracted, or scattered IR light is directly incident on the IR receiver 162. For example, information based on the IR light received at the IR receiver 162, such as distance information about the subject, may be distorted. According to an embodiment, the at least one film 142a may be configured as an IR blocking film to prevent IR light emitted from the IR light emitter 161 from leaking into other components (e.g., the IR receiver) adjacent to the IR light emitter 161 within the housing 110. According to another embodiment, the at least one film 142a may include an adhesive component to bond an inner surface of the housing 110 (e.g., an inner surface of the camera window 156) to components. According to an embodiment, the protective member 142b may serve as a cushioning layer including a material such as rubber or poron and protect components inside the housing 110 from external impact. According to another embodiment, the protective member 142b may include a polyurethane foam material to provide heat resistance and thus serve to suppress expansion or contraction of components inside the housing 110 when the components inside the housing 110 are heated up. According to one or more embodiments, while the at least one film 142a and protective member 142b are shown in FIG. 6 as stacked with each other as separate components, they may be formed as substantially one component without necessarily being limited thereto.

Figure 7:
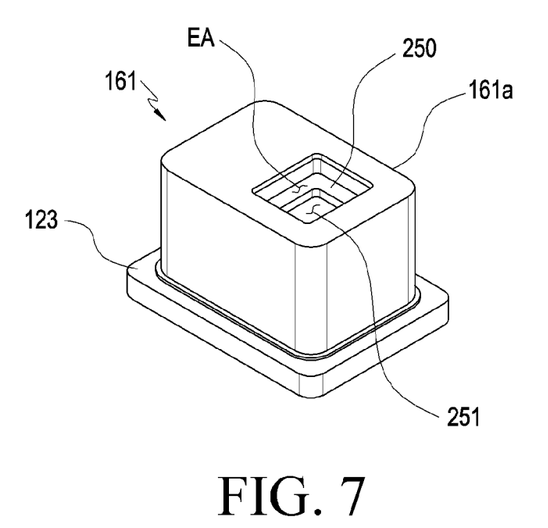
FIG. 7 is a perspective view illustrating an infrared light source module (an infrared light emitter) mounted in an electronic device and capable of obtaining depth information according to one or more embodiments of the disclosure.
Figure 8:
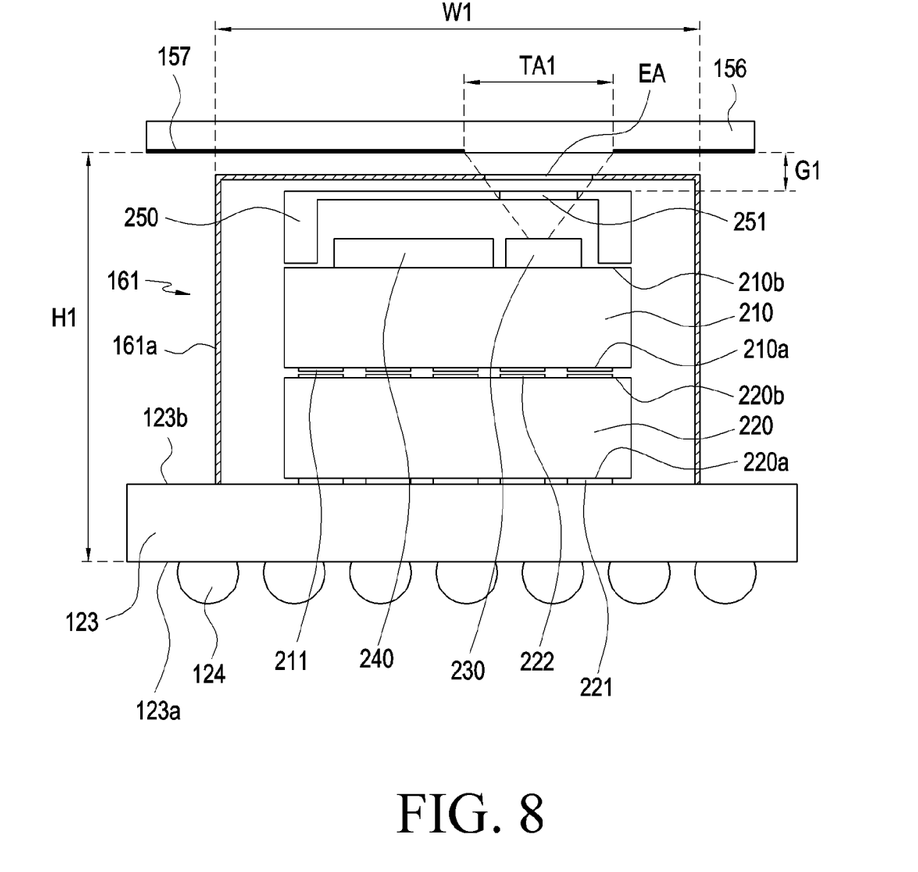
FIG. 8 is a cross-sectional view illustrating an infrared light source module according to an embodiment of the disclosure.

FIG. 7 is a perspective view illustrating the IR light emitter 161 mounted in an electronic device and capable of obtaining depth information according to an embodiment. FIG. 8 is a cross-sectional view illustrating the IR light emitter 161 according to an embodiment.

The IR light emitter 161 may include at least one component. The at least one component may correspond to a VCSEL as a light source 230. In another embodiment, the IR light emitter 161 may include both a flood-type light source and a spot-type light source as the light source 230. Further, the at least one component may be a drive IC 240 for driving the light source 230.

The IR light emitter 161 may include a substrate 210 to mount the at least one component thereon. The substrate 210 may be formed to include a material that effectively dissipates heat generated by the at least one component mounted on one surface thereof. For example, the substrate 210 may include an $Al_2O_3$ or AlN material as a material for heat dissipation. According to an embodiment, the substrate 210 may include a third surface 210a and a fourth surface 210b, and the at least one component may be mounted on the fourth surface 210b. The light source 230 and the drive IC 240 are shown in the drawing as disposed adjacent to each other on the same surface (e.g., the fourth surface 210b) of the substrate 210, which does not limit the scope of the disclosure, and according to another embodiment, the light source 230 and the drive IC 240 may be stacked with each other.

The IR light emitter 161 may further include an interposer 220 stacked with the substrate 210. Referring again to FIG. 6, the IR receiver 162 may be formed at a greater height than the IR light emitter 161. According to an embodiment, given that the height of a space from the first PCB 121 to the camera window 156 is equal to the height of a space from the second PCB 122 to the camera window 156, a gap between the IR light emitter 161 and the camera window 156 may be much larger than a gap between the IR receiver 162 and the camera window 156. Therefore, the height of the IR light emitter 161 may be similar to the height of the IR receiver 162 by stacking the interposer 220 on the substrate 210 of the IR light emitter 161. The interposer 220 may include a fifth surface 220a and a sixth surface 220b facing to a direction opposite to the fifth surface 220a, and the substrate 210 may be stacked on the sixth surface 220b.

The IR light emitter 161 may be mounted on a packaging substrate 123, as illustrated in FIGS. 7 and 8. The packaging substrate 123 may include one surface 123a and the other surface 123b facing to an opposite direction of the first surface 123a, and the other surface 123b of the packaging substrate 123 may face the fifth surface 220a of the interposer 220. Herein, the packaging substrate 123 may be a component identical to the first PCB 121 illustrated in FIG. 6 or separate from the first PCB 121 illustrated in FIG. 6. In an example, the IR light emitter 161 may be packaged as a single module, including the packaging substrate 123, and assembled into the electronic device (e.g., the electronic device 100 of FIG. 1). When the IR light emitter 161 is provided as a single module, including the packaging substrate 123, a solder ball 124 may be formed on the one surface 123a of the packaging substrate 123, which enables the IR light emitter 161 to be mounted on the main circuit board (e.g., the first PCB 121 of FIG. 6) of the electronic device 100. Regarding the stacked structure of the IR light emitter 161 according to the embodiment illustrated in FIG. 8, a first terminal 211 formed on the third surface 210a of the substrate 210 may be formed to contact a third terminal 222 formed on the sixth surface 220b of the interposer 220, and a second terminal 221 formed on the fifth surface 220a of the interposer 220 may be connected to the other surface 123b of the packaging substrate 123. According to one or more embodiments, the first terminal 211 and the third terminal 222 described above may be formed as a substantially integrated component.

The IR light emitter 161 may include at least one component (e.g., the light source 230 and the drive IC 240) and a module housing 250 for surrounding the at least one component. An opening 251 may be formed on one surface of the module housing 250 to provide a radiation path for the light source 230.

The IR light emitter 161 may further include the shielding member 161a (e.g., a shield CAN) to shield high-power electromagnetic waves emitted from the light source 230. According to an embodiment, the shielding member 161a may be formed to cover at least a portion of the module housing 250, with an end of the shielding member 161a fixed to the other surface 123b of the packaging substrate 123. In the embodiment illustrated in FIG. 8, it may be essential to include the packaging substrate 123 for fixing the shielding member 161a in order to form the shielding member 161a. Surrounded by the shielding member 161a, the IR light emitter 161 may be mounted at a position corresponding to the first light-transmitting area TA1 in the internal space of the housing (e.g., the housing 110 of FIG. 1) of the electronic device 100. An opening formed on the shielding member 161a may define the IR emitting area EA of the IR light emitter 161.

According to the embodiment illustrated in FIGS. 7 and 8, the IR light emitter 161 may be configured to include the shielding member 161a formed wider and taller than the module housing 250. In this case, IR light output from the light source of the IR light emitter 161 may be radiated to the outside of the electronic device by sequentially passing through the opening 251 formed on the module housing 250 and the IR emitting area EA of the shielding member 161a.

Figure 9:
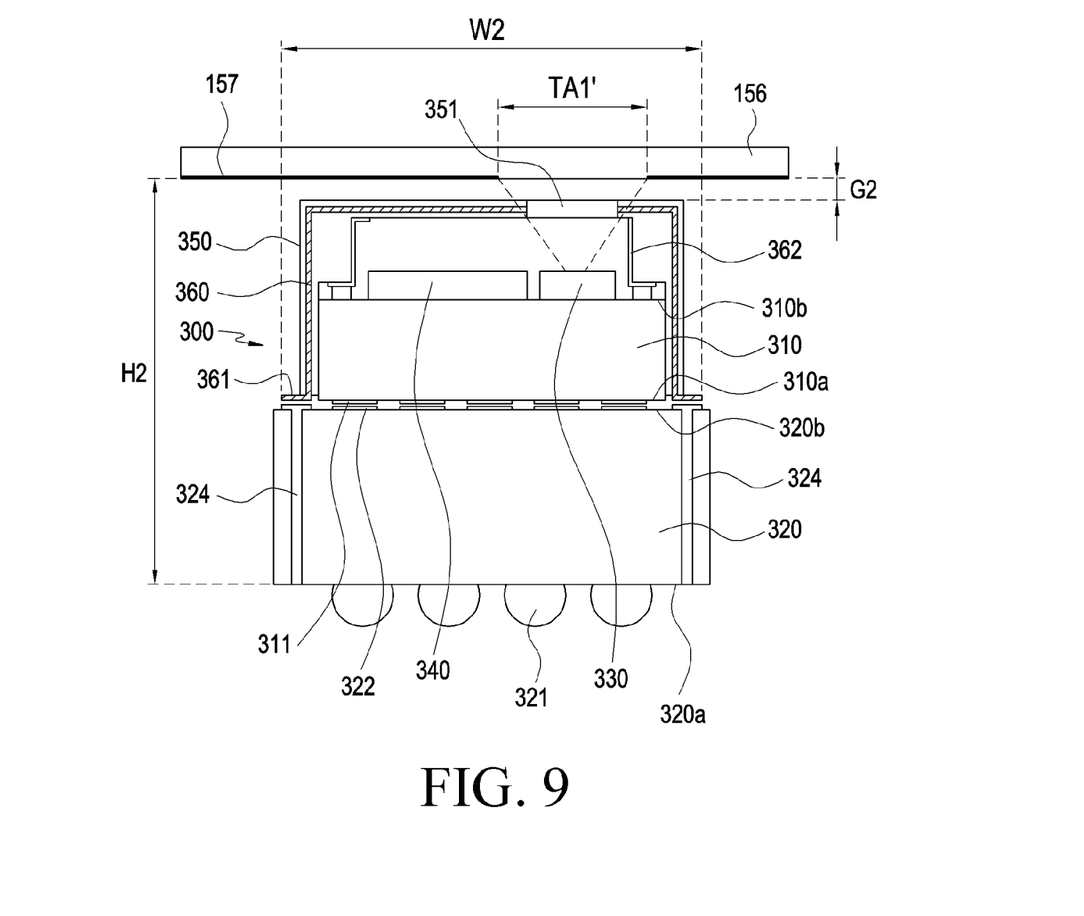
FIG. 9 is a cross-sectional view illustrating an infrared light source module according to one or more embodiments of the disclosure.

FIG. 9 is a cross-sectional view illustrating an IR light emitter 300 according to one or more embodiments of the disclosure.

The IR light emitter 300 may include at least one component. The at least one component may be correspond to a VCSEL as a light source 230. In another embodiment, the IR light emitter 300 may include both a flood-type light source and a spot-type light source as the light source 330. Further, the at least one component may be a drive IC 340 for driving the light source 330.

The IR light emitter 300 may include a substrate 310 to mount the at least one component thereon. According to an embodiment, the substrate 310 may include a third surface 310a and a fourth surface 310b, and the at least one component may be mounted on the fourth surface 310b.

Additionally, the IR light emitter 300 may further include an interposer 320 stacked with the substrate 310. As the interposer 320 is stacked on the substrate 310 of the IR light emitter 300, the height of the IR light emitter 300 may be similar to the height of the IR receiver (such as the IR receiver 162 of FIG. 6). The interposer 320 may include a fifth surface 320a and a sixth surface 320b facing to an opposite direction of the fifth surface 320a, and the substrate 310 may be stacked on the sixth surface 320b.

The IR light emitter 300 according to the embodiment illustrated in FIG. 9 may include the same components as the IR light emitter 161 according to the embodiment illustrated in FIG. 8. For example, the light source 330 included in the IR light emitter 300 may be the same light source with the same angle of view as the light source 230 included in the IR light emitter 161. Additionally, the IR light emitter 300 according to the embodiment illustrated in FIG. 9 may include the substrate 310 and the interposer 320 corresponding to the substrate 210 and the interposer 220 according to the embodiment illustrated in FIG. 8.

The IR light emitter 300 may provide a module housing 350 different from the module housing 250 illustrated in the embodiment illustrated in FIG. 8. Unlike the module housing 250 illustrated in FIG. 8, which is surrounded by the shielding member 161a, the module housing 350 according to the embodiment illustrated in FIG. 9 may have a built-in shielding member 360. For example, the shielding member 360 may be formed on an inner surface of the module housing 350 to surround electronic components (e.g., the light source 330 and the drive IC 340). According to an embodiment, the module housing 350 may be formed to include a metal, liquid crystal plastic (LCP), or polymer material. The shielding member 360 may be formed to include a new silver (e.g., nickel silver) or SUS material. According to one or more embodiments, the module housing 350 and the shielding member 360 may be formed in a double injection molding structure according to a laser direct structuring (LDS) or molded interconnection device (MID) scheme. According to one or more embodiments, the IR light emitter 300 may further include a support 362 supporting at least a portion of the module housing 350. The support 362 may be formed on a portion of the fourth surface 310b of the substrate 310 and configured to support the dual injection structure of the module housing 350 and the shielding member 360.

According to one or more embodiments, the module housing 350 and the shielding member 360 may be disposed to surround peripheries of side surfaces of the substrate 310 as well as electronic components (e.g., the light source 330 and the drive IC 340). Additionally, the module housing 350 and the shielding member 360 may extend to an end of the third surface 310a of the substrate 310. For example, the module housing 350 and the shielding member 360 may extend from an end of the fourth surface 310b of the substrate 310 to an end of the third surface 310a, while contacting the side surfaces of the substrate 310. According to an embodiment, the module housing 350 and the shielding member 360 may be formed to completely surround the side surfaces of the substrate 310 without being spaced apart from the side surfaces of the substrate 310. According to another embodiment, the module housing 350 and the shielding member 360 extending to an end of the third surface 310a of the substrate 310 may be formed such that their ends face the sixth surface 320b of the interposer 320.

According to one or more embodiments, the IR light emitter 300 according to the embodiment illustrated in FIG. 9 may fix an end of the shielding member 360 to the sixth surface 320b of the interposer 320. In packaging the IR light emitter 300, the packaging substrate 123 may be omitted in the embodiment illustrated in FIG. 9, unlike the embodiment illustrated in FIG. 8, which requires the packaging substrate 123. According to the embodiment illustrated in FIG. 9, a solder ball may be formed on the fifth surface 320a of the interposer 320, instead of the omitted packaging substrate 123, in the IR light emitter 300.

Unlike the configurations of the IR light emitter 161 and the interposer 220 according to the embodiment illustrated in FIG. 8, the IR light emitter 300 according to the embodiment illustrated in FIG. 9 may further include a via 324 formed along the periphery of the interposer 320. The via 324 may be a component provided to block noise emitted from the interposer 320 itself to the outside of the IR light emitter 300 and, according to an embodiment, may be electrically connected to the shielding member 360 to form a ground wall. To this end, a rim electrode (e.g., a rim electrode 325 described later with reference to FIGS. 10A and 10B) may be formed on the sixth surface 320b of the interposer 320, for electrical connection to the shielding member 360.

Figure 10A:
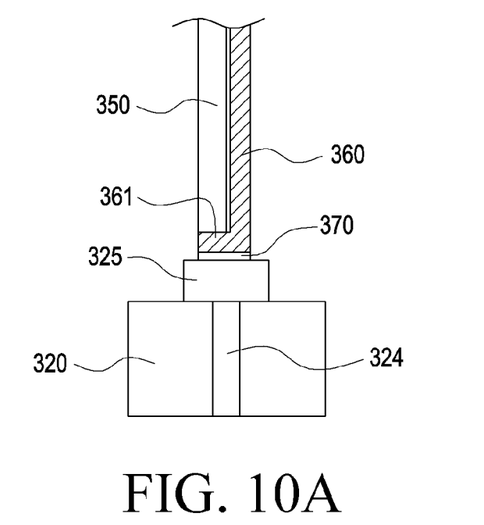
FIG. 10A is a diagram illustrating ends of a module housing and a shielding member according to an embodiment of the disclosure.
Figure 10B:
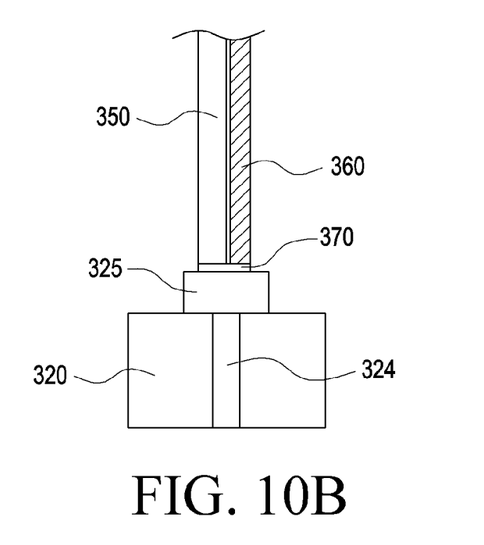
FIG. 10B is a diagram illustrating ends of a module housing and a shielding member according to another embodiment of the disclosure.

FIG. 10A is a diagram illustrating ends of the module housing 350 and the shielding member 360 according to an embodiment of the disclosure. FIG. 10B is a diagram illustrating ends of the module housing 350 and the shielding member 360 according to another embodiment of the disclosure.

According to an embodiment, as illustrated in FIG. 10B, the module housing 350 and the shielding member 360 may be formed with their ends parallel to each other. At the ends of the module housing 350 and the shielding member 360, a solder 370 may be formed on a portion that contacts the module housing 350 and the shielding member 360 to implement electrical connection between the shielding member 360 and the border electrode 325.

According to another embodiment, a flat portion 361 may be formed to extend from the end of the shielding member 360, as illustrated in FIG. 10A. For example, as the flat portion 361 is formed, the end of the shielding member 360 may have a "— I" shape, which may allow for electrical connection to the rim electrode 325 via the solder 370 over a larger area. The formation of the solder 370 may be facilitated by forming the end of the shielding member 360 to have the flat portion 361.

According to the embodiment illustrated in FIG. 9, as the shielding member 360 is built in the module housing 350, an opening formed on the module housing 350 and an opening formed on the shielding member 360 may be integrated into a single opening 351. That is, IR light output from the light source of the IR light emitter 300 passes through only one opening to reach the camera window 156.

Regarding both the embodiment illustrated in FIG. 8 and the embodiment illustrated in FIG. 9, the gap between the IR light emitter and the camera window 156 may be reduced (G1>G2) in the embodiment illustrated in FIG. 9, compared to the embodiment illustrated in FIG. 8. Furthermore, because the gap between the IR light emitter and the camera window 156 is reduced in the embodiment illustrated in FIG. 9, the distance from an emission position of the light source to the camera window 156 may be reduced, while the light source having the same angle of view as in the embodiment illustrated in FIG. 8 is used. Therefore, the size of the light-transmitting area (or the size of the window hole) may be reduced (TA1>TA1'), compared to the embodiment illustrated in FIG. 8. Furthermore, according to the embodiment illustrated in FIG. 9, the width of the IR light emitter may also be reduced (W1>W2) due to the shielding member 360 built in the module housing 350, compared to the embodiment illustrated in FIG. 8. According to the embodiment illustrated in FIG. 9, the interposer may take over the role of the packaging substrate, thereby reducing the height of the IR light emitter (H1>H2) compared to the embodiment illustrated in FIG. 8. In summary, according to the embodiment illustrated in FIG. 9, the light-transmitting area may be formed smaller and the IR light emitter 300 having the compact size may be provided, compared to the IR light emitter 161 according to the embodiment illustrated in FIG. 8.

According to one or more embodiments of the disclosure, an electronic device (e.g., the electronic device 100 of FIG. 1) may include: a housing (e.g., the housing 110 of FIG. 1) including a first surface (e.g., the first surface 110A of FIG. 1) facing a first direction and a second surface (e.g., the second surface 110B of FIG. 2) facing a direction opposite to the first direction; a plurality of light-transmitting areas (e.g., the light-transmitting areas TA of FIG. 3) formed on the second surface; a PCB (e.g., the PCB 121 of FIG. 6) disposed between the first surface and the second surface; an IR light emitter (e.g., the IR light emitter 300 of FIG. 9) disposed on the PCB and disposed corresponding to a first light-transmitting area of the plurality of light-transmitting areas, and emitting infrared light through a first light-transmitting area (e.g., the first light-transmitting area TA1 of FIG. 4); and an IR receiver (e.g., the IR receiver 162 of FIG. 5) disposed corresponding to a second light-transmitting area (e.g., the second light-transmitting area TA2 of FIG. 4) of the plurality of light-transmitting areas. The IR light emitter may include: a substrate (e.g., the substrate 310 of FIG. 9) including a third surface (e.g., the third surface 310a of FIG. 9) and a fourth surface (e.g., the fourth surface 310b of FIG. 9) facing a direction opposite to the third surface; at least one electronic component including a light source (e.g., the light source 330 of FIG. 9) disposed on the fourth surface of the substrate; a module housing (e.g., the module housing 350 of FIG. 9) surrounding the at least one electronic component of the substrate; and a shielding member (e.g., the shielding member 360 of FIG. 9) built in the module housing, for shielding electromagnetic waves.

According to one or more embodiments, the module housing and the shielding member may be disposed to surround a periphery of a side surface of the substrate.

According to one or more embodiments, the module housing and the shielding member may extend to an end of the third surface of the substrate.

According to one or more embodiments, a flat portion (e.g., the flat portion 361 of FIG. 9) extending parallel to the third surface may be formed on the end of the shielding member.

According to one or more embodiments, the IR light emitter may further include an interposer (e.g., the interposer 320 of FIG. 9) stacked with the substrate, adjacent to the third surface of the substrate.

According to one or more embodiments, the IR light emitter may further include a via (e.g., the via 324 of FIG. 9) built in along a periphery of the interposer.

According to one or more embodiments, the via may form a ground wall.

According to one or more embodiments, the interposer may include a rim electrode (e.g., the rim electrode 325 of FIG. 10A) for electrical connection to the shielding member.

According to one or more embodiments, the shielding member and the rim electrode may be electrically connected through a solder (e.g., the solder 370 of FIG. 10A).

According to one or more embodiments, the interposer may include a fifth surface and a sixth surface facing a direction opposite to the fifth surface, and a solder ball (e.g., the solder ball 321 of FIG. 9) may be formed on the fifth surface.

According to one or more embodiments, the light source may be a VCSEL.

According to one or more embodiments, the electronic component may further include a drive IC (e.g., the drive IC 340 of FIG. 9).

According to one or more embodiments, the substrate may include an $Al_2O_3$ or AlN material.

According to one or more embodiments, the module housing and the shielding member may be formed in a double injection molding structure.

According to one or more embodiments, the electronic device may further include a support supporting at least a portion of the module housing.

According to one or more embodiments of the disclosure, an IR light emitter (e.g., the IR light emitter 300 of FIG. 9) mounted in an electronic device (e.g., the electronic device 100 of FIG. 1), for obtaining depth information may include: a substrate (e.g., the substrate 310 of FIG. 9); at least one electronic component including a light source (e.g., the light source 330 of FIG. 9) disposed on one surface of the substrate; an interposer (e.g., the interposer 320 of FIG. 9) stacked with the substrate, adjacent to the other surface of the substrate; a module housing (e.g., the module housing 350 of FIG. 9) surrounding the at least one electronic component of the substrate; and a shielding member (e.g., the shielding member 360 of FIG. 9) built in the module housing.

According to one or more embodiments, the module housing and the shielding member may be disposed to surround a periphery of a side surface of the substrate.

According to one or more embodiments, the IR light emitter may further include a via (e.g., the via 324 of FIG. 9) built in along a periphery of the interposer.

According to one or more embodiments, the via may form a ground wall.

According to one or more embodiments, the module housing and the shielding member may extend to an end of the substrate, a flat portion (e.g., the flat portion 361 of FIG. 9) extending parallel to the one surface of the substrate may be formed on an end of the shielding member, and the flat portion may be electrically connected to a rime electrode (e.g., the rim electrode 325 of FIG. 10A) formed on an end of the via.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

While the disclosure has been described above with reference to specific embodiments, it will be apparent to those skilled in the art that many modifications can be made without departing from the scope of the disclosure.

What is claimed is:

1. An electronic device comprising:
    a housing including a first surface facing a first direction and a second surface facing a second direction opposite to the first direction;
    a plurality of light-transmitting areas on the second surface;
    a printed circuit board disposed between the first surface and the second surface;
    an infrared light emitter disposed on the printed circuit board, the infrared light emitter corresponding to a first light-transmitting area of the plurality of light-transmitting areas, and being configured to emit infrared light through the first light-transmitting area; and
    an infrared receiver corresponding to a second light-transmitting area of the plurality of light-transmitting areas,
    wherein the infrared light emitter includes:
        a substrate including a third surface facing a third direction and a fourth surface facing a fourth direction opposite to the third direction;
        at least one electronic component including a light source disposed on the fourth surface of the substrate;
        a module housing surrounding the at least one electronic component of the substrate; and
        a shield can disposed in the module housing, the shield can being configured to shield electromagnetic waves, and
    wherein the module housing is different from the shield can.

2. The electronic device of claim 1, wherein the module housing and the shield can are disposed to surround a periphery of a side surface of the substrate.

3. The electronic device of claim 1, wherein both of the module housing and the shield can extend to an end of the third surface of the substrate.

4. The electronic device of claim 3, wherein a flat portion extending parallel to the third surface is disposed on the end of the shield can.

5. The electronic device of claim 1, wherein the infrared light emitter further includes an interposer stacked with the substrate, the interposer being adjacent to the third surface of the substrate.

6. The electronic device of claim 5, wherein the infrared light emitter further includes a via disposed in along a periphery of the interposer.

7. The electronic device of claim 6, wherein the via is a ground wall.

8. The electronic device of claim 5, wherein the interposer includes a rim electrode configured to be connected to the shield can.

9. The electronic device of claim 8, wherein the shield can is electrically connected to the rim electrode through a solder.

10. The electronic device of claim 5, wherein the interposer includes a fifth surface facing a fifth direction and a sixth surface facing a sixth direction being opposite to the fifth direction, and
    wherein a solder ball is disposed on the fifth surface.

11. The electronic device of claim 1, wherein the light source is a vertical-cavity surface-emitting laser (VCSEL).

12. The electronic device of claim 1, wherein the at least one electronic component further includes a drive integrated circuit (IC).

13. The electronic device of claim 1, wherein the substrate includes an $Al_2O_3$ or AlN material.

14. The electronic device of claim 1, wherein both of the module housing and the shield can are disposed in a double injection molding structure.

15. The electronic device of claim 1, further comprising a support supporting at least a portion of the module housing.

16. An IR light emitter mounted in an electronic device for obtaining depth information may include:
    a substrate;
    at least one electronic component including a light source disposed on a first surface of the substrate;
    an interposer stacked with the substrate, adjacent to a second surface of the substrate; a module housing surrounding the at least one electronic component of the substrate; and
    a shield can built in the module housing,
    wherein the module housing is different from the shield can.

17. The IR light emitter of claim 16, wherein the module housing and the shield can may be disposed to surround a periphery of a side surface of the substrate.

18. The IR light emitter of claim 16, wherein the IR light emitter further include a via built in along a periphery of the interposer.

19. The IR light emitter of claim 18, wherein the via forms a ground wall.

20. The IR light emitter of claim 19, wherein the module housing and the shield can may extend to an end of the substrate, a flat portion extending parallel to the one surface of the substrate may be formed on an end of the shield can, and the flat portion may be electrically connected to a rime electrode formed on an end of the via.

* * * * *